United States Patent
Wiggins

[11] 3,980,106
[45] Sept. 14, 1976

[54] FLUID CONTAINING STRUCTURE

[75] Inventor: Edwin W. Wiggins, Bridgeton, Mo.

[73] Assignee: McDonnell Douglas Corporation, St. Louis, Mo.

[22] Filed: Aug. 22, 1975

[21] Appl. No.: 606,850

Related U.S. Application Data

[63] Continuation of Ser. No. 387,913, Aug. 13, 1973, abandoned.

[52] U.S. Cl. .............................. 138/140; 220/63 A; 285/55; 285/238
[51] Int. Cl.² ..................... F16L 9/14; B65D 25/14; F16L 21/00
[58] Field of Search ....................... 220/63 R, 63 A; 138/140, 141, 123, 124, 127, 153; 285/55, 238

[56] References Cited
UNITED STATES PATENTS

| | | | |
|---|---|---|---|
| 3,509,016 | 4/1970 | Underwood et al. | 220/63 A |
| 3,698,587 | 10/1972 | Baker et al. | 220/63 A X |
| 3,830,261 | 8/1974 | Hochberg et al. | 138/141 |
| 3,901,281 | 8/1975 | Morrisey | 138/140 |

Primary Examiner—William Price
Assistant Examiner—Steven M. Pollard
Attorney, Agent, or Firm—Gravely, Lieder & Woodruff

[57] ABSTRACT

A conduit or other fluid containing structure includes a metal tube having end portions which are exposed for connecting purposes and a liner portion of reduced wall thickness between the end portions. An impregnated braid surrounds the liner portion for rigidifying the same. When the conduit is used as a self-sealing fuel line the thickness of the liner is such that it does not possess enough strength to take on a permanent outward deformation in the presence of the impregnated braid surrounding it, and consequently petalling does not occur. In that application the impregnated braid is surrounded by a sealant capable of swelling when contacted by the fuel, and the sealant is encircled by another impregnated braid to protect and maintain it in place.

11 Claims, 6 Drawing Figures

U.S. Patent  Sept. 14, 1976  3,980,106
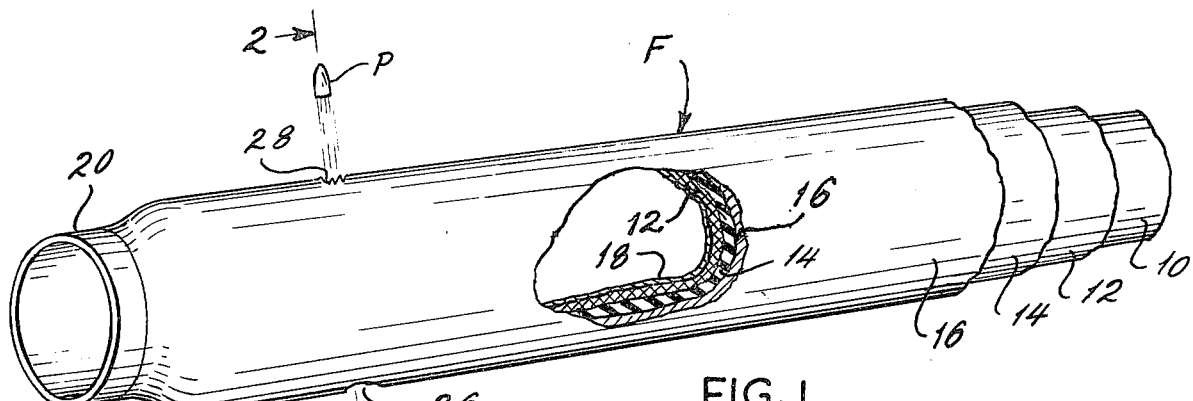
FIG. 1
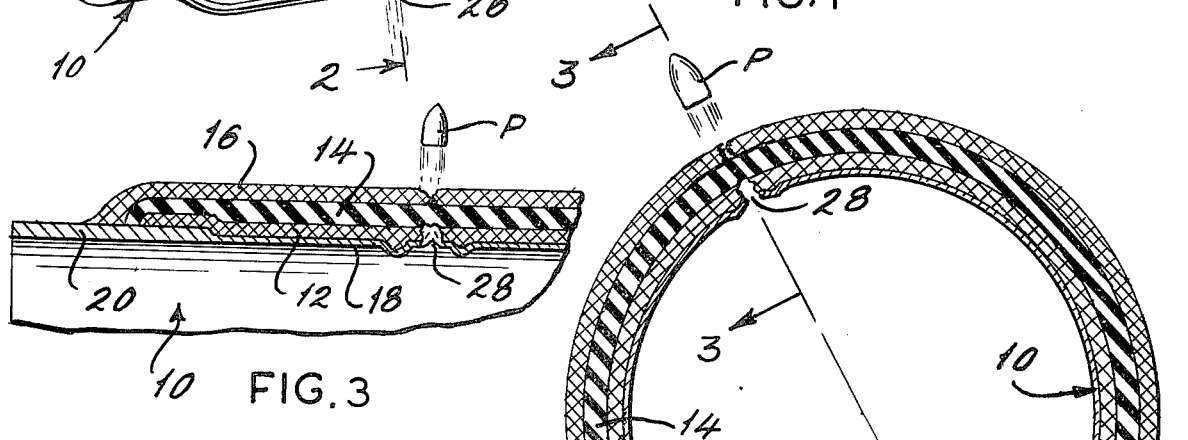
FIG. 3
FIG. 2
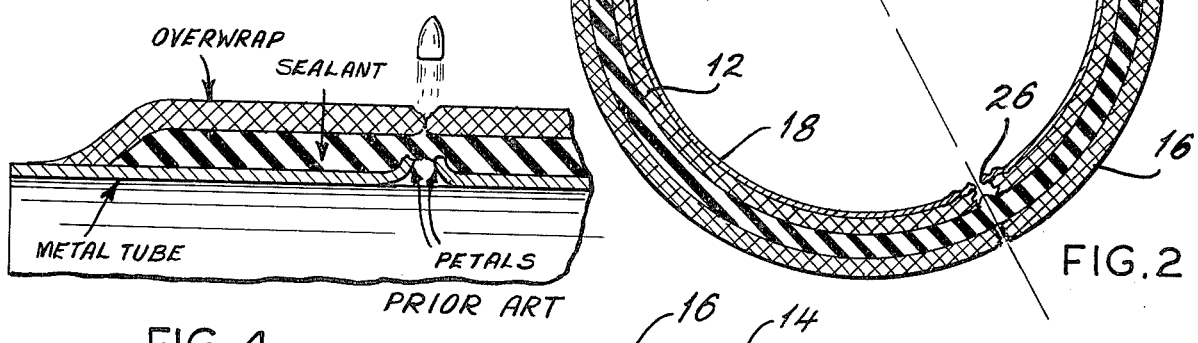
PRIOR ART
FIG. 4
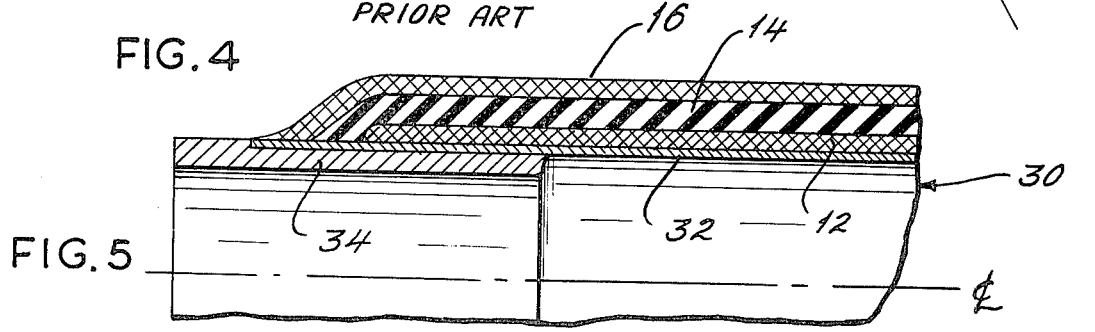
FIG. 5
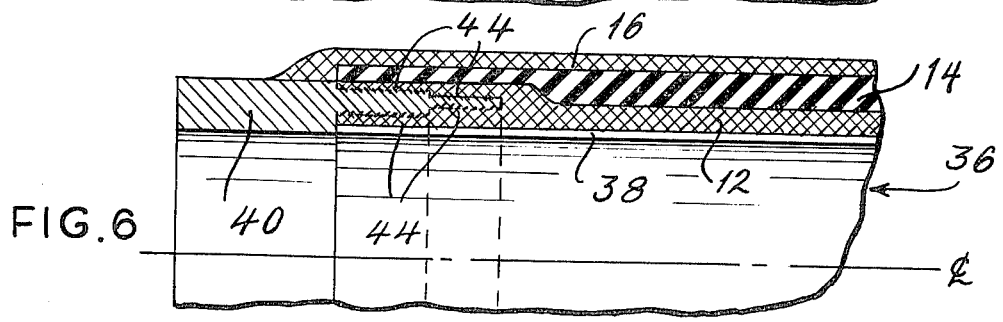
FIG. 6

FLUID CONTAINING STRUCTURE

This is a continuation of application Ser. No. 387,913, filed Aug. 13, 1973, now abandoned.

BACKGROUND OF THE INVENTION

This invention relates in general to fluid conduits and containers, and more particularly to fluid-containing structures which are compact and light in weight and to a process for making the same.

The fuel lines and tanks of military aircraft are extremely vulnerable to antiaircraft projectiles, and of course, the rupture of a fuel line or fuel tank can have disasterous affects, since it will deprive the aircraft engines of their fuel supply and can result in the spillage of flammable fuel into areas where it might easily be ignited. To reduce these hazards, the typical metal fuel line tube for military aircraft is encased in natural gum rubber which is in turn encased in a fabric overwrap to maintain it in place. A projectile penetrating the metal tube will also penetrate the gum rubber, but the fuel which leaves through the holes in the metal tube will cause the gum rubber to swell and seal the rupture. The metal tube, however, tends to flare outwardly at the exit hole and the flared segments of metal surrounding the hole hold some of the gum rubber sealant away from the hole. The flared segments left by the exiting projectile are often referred to as "petals", and the sealant layer must be made thick enough to accommodate the petalling. This increases the weight and bulk of the fuel line substantially.

To reduce the weight of such fuel lines it has been proposed that a light weight foam layer be interposed between the metal tube and the sealant layer so that the light weight foam will accommodate the petalling, while the surrounding sealant material performs only the sealing function. Use of a so-called foam standoff, however, does not reduce the bulk of the fuel line, and indeed often increases the diameter to such an extent that the fuel line cannot be used as a replacement for existing lines without enlarging bulkhead apertures, bracketing, and the like.

It has also been suggested that actual fuel confining tube be formed from various plastic materials having a high modulus of elasticity so that that material will not petal, but instead will fracture to leave a clean hole therein when penetrated by a projectile. However, to obtain sufficient strength these materials must have relatively thick walls. Moreover, they are often incompatible with fuels. Also, they do not conduct electricity and as a result electric charges built up by the moving fuel are not dissipated to ground. This is the so-called triboelectric phenomenon.

Non-metal fuel tubes, as well as other types of non-metal conduits, possess another significant disadvantage, and that is that they cannot be coupled easily and securely.

SUMMARY OF THE INVENTION

One of the principal objects of the present invention is to provide a fuel line which is light in weight and highly compact. Another object is to provide a fuel line which can be connected to other fuel lines, tanks, and equipment with standard fittings. A further object is to provide a fuel line which dissipates triboelectric charges. These and other objects and advantages will become apparent hereinafter.

The present invention is embodied in a fluid-containing structure having a thin-walled metal liner, and means over the liner for rigidifying it. The invention also resides in the process for making the structure and that includes chemically milling a tube to form the thin-walled liner as well as braiding over the liner and impregnating the braid to rigidify the liner. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a perspective view of a fuel line constructed in accordance with and embodying the present invention;

FIG. 2 is a full sectional view of the fuel line at the location where it is penetrated by a projectile;

FIG. 3 is a sectional view taken along line 3—3 of FIG. 2;

FIG. 4 is a fragmentary sectional view of a prior art fuel line at the exit hole left by a projectile;

FIG. 5 is a fragmentary sectional view of the wall of a modified fuel line; and

FIG. 6 is a fragmentary sectional view of the wall of another modified fuel line.

DETAILED DESCRIPTION

Referring now to the drawings (FIGS. 1 & 2), F designates a fuel line which basically includes an impervious metal tube 10 defining a hollow fluid channel, a tube overwrap 12 around the tube 10, a sealant 14 encircling the tube and being capable of swelling when fuel from the tube 10 contacts it, and a sealant overwrap 16 which surrounds the sealant 14 and maintains it in place. The fuel line F can withstand penetration by a projectile P without loss of significant quantities of fuel. As used herein, the term projectile means a bullet or fragment which doesn't sever the line F.

The impervious tube 10 possesses the same inside diameter as the metal tubes of conventional fuel lines and is made from a suitable metal such as aluminum, titanium, or stainless steel alloys. The tube 10 for most of its length is composed of a liner portion 18 (FIGS. 1–3) having extremely thin wall thickness, while at its ends it is provided with connecting portions 20 (FIGS. 1 & 3) which are formed integral with the liner portion 18 and are substantially greater in wall thickness. For example, the connecting portions 20 should have a wall thickness equalling that of the metal tubes in conventional fuel lines so that they can be attached to standard fuel line fittings in the usual manner. In this connection, the wall thickness of conventional fuel lines of current manufacture is not less than approximately 0.028 inches. On the other hand, the wall thickness of the intervening liner portion 18 should be between 0.002 inches and 0.015 inches with the thickness being dependent upon the metal used. In particular, when the tube 10 is made from 6061-T6 aluminum alloy the wall thickness of the liner portion 18 thereof should be between 0.002 inches and 0.010 inches and preferably 0.008 inches. When the tube is made from the titanium alloy Ti-6A1-6V-2Sn, the wall thickness of the liner portion 18 should be between 0.002 and 0.010 inches and preferably 0.008 inches. If the tube 10 is made from stainless steel, the wall thickness of the liner portion 18 should be between 0.002 and 0.010 inches and preferably 0.010 inches. The liner portion 18 may have rip stops and stiffeners formed in it and these are merely areas of greater thickness, usually a thickness equalling that of the connecting portions 20. In such a case the liner portion 18 may be thinner than 0.002 inches. Generally speaking, the thickness of the liner portion 18 should be such that it possesses less strength than the surrounding tube overwrap 12 so that the tube overwrap 12 will rebound upon the passage of a projectile P through it and in so doing will turn any outward deformation of the metal liner portion 18 back inwardly. This prevents the formation of so-called petals in the liner portion 18.

One way to form the metal tube 10 in its unusual configuration is by chemical milling procedures. In such a case, standard tube stock having a wall thickness equalling that of the connecting portions 20 is cut to the length required for the metal tube 10 and is further formed to the final line shape. Then the areas which are to form the connecting portion 20 are masked with a material not affected by etchants, and likewise so are the areas where the rip stops and integral stiffeners are to be located. The ends of the tube are also plugged. Once the masking is in place and the ends closed, the entire length of tube stock is immersed in a suitable chemical milling solution which is usually a strong acid or alkaline solution. The solution dissolves the exposed metal on the tube 10 and thereby reduces the wall thickness of the tube 10. In effect, the solution etches the tube 10 on the unmasked areas thereof. The tube 10 remains in the chemical milling solution until the liner portion 18 reaches the desired wall thickness, then it is removed and the etchant is washed from it.

The tube overwrap 12 rigidifies the liner portion 18 of the metal tube 10, and extends not only over the liner portion 18 but also over the adjoining areas of the two connecting portions 20 (FIG. 3). However, the overwrap 12 does not completely cover the connecting portions 20. The overwrap 12 should have a relatively high modulus of elasticity so that it will for the most part fracture when pierced by a projectile instead of bending or deforming.

The overwrap 12 is composed of fibrous strands braided around the tube 10 and a suitable matrix in which the strands are embedded. Strands of glass fibers, dacron, rayon, nylon, graphite, and PRD-49 (an organic fiber manufactured by DuPont), are all suitable for use in the tube overwrap 12 with glass fibers being preferred. The strands of fibrous material are braided directly over the exterior surface of the tube 10 with the braid angle, that is that angle between the crossing strands which opens in the circumferential direction, being between 10° and 85°. A braid angle of 25° is preferred. The braiding of the strands imparts great strength to the tube overwrap 12 and hence strengthens the tube 10. Moreover, the strands of the braid are quite close together to provide maximum resistance to hoop stresses in the tube 10. The braid may be in one ply or multiple plies and may include longitudinal fibers, depending on the strength desired. The matrix in which the strands are embedded is a resinous or polymeric material which has been cured or polymerized. These materials are preferably applied to the fibrous strands in liquid form and under substantial pressure so as to achieve a thorough impregnation of the braid. Usually the tube 10 with the braided strands surrounding it is immersed in the liquid matrix-forming material. This step, however, may be eliminated to reduce production costs by using so-called preimpregnated fibers. Such fibers have the resinous or polymetric material on them so that both components of the tube overwrap 12 are applied in the braiding operation. In any event, once the resinous or polymetric matrix-forming material is in the braid, the material is cured or polymerized at room temperature or by heating, in which case it sets up and forms the strengthening matrix for the strands. Suitable resinous and polymeric materials are epoxy, silicone, polyurethane, polyester, polysulfide, fluorosilicone, and fluorocarbon. An acceptable method for braiding the fibrous strands about the tube 10 and for embedding the braid in the resin matrix is disclosed in U.S. Pat. No. 3,586,058.

The sealant 14 surrounds and completely covers the tube overwrap 12 (FIG. 2), and it is preferably between 0.05 inches and 0.20 inches thick. The sealant 14 may be a polymeric material and should react with the fuel carried by the line F in such a manner that it swells and tends to seal off any puncture therein. Natural rubber and non-fuel resistant silicone rubber, such as the dimethyl silicone rubbers, are suited for this purpose. These rubbers do not remain dimensionally stable in the presence of typical hydrocarbon fuels such as gasoline, kerosene and jet fuels, but on the contrary, become tacky and swell. Sealants of the foregoing nature usually are quite dense, ranging in density from 30–95 lbs./ft.$^3$. It is therefore desirable to use as little sealant as possible.

The sealant overwrap 16 surrounds the sealant 14 (FIG. 2) to maintain the sealant 14 in place, and should be between 0.060 inches and 0.120 inches thick, the exact thickness depending on the size of the projectile to be defeated. The sealant overwrap 16 is formed from strands of high strength fibrous material and a matrix in which the strands are embedded. Any of the fibrous materials suitable for use in the tube overwrap 12 are suited for the sealant overwrap 16. The strands of the sealant overwrap 16 are braided about the sealant layer 14 with the braid being quite tight to place the sealant in a condition of precompression. The braid may be in one or more plies. Braid angles between 10° and 85° are acceptable with 25° being preferred. In comparison to the tube overwrap 12, the strands of the sealant overwrap 16 are spaced relatively far apart to provide space for a relatively high content of matrix material. The matrix of the sealant overwrap 16 is a resinous, elastomeric, or polymeric material such as epoxy, silicone, fluorosilicone, polyurethane, acrylonitrile rubber, polysulfide, or fluorocarbon, and this material forms a firm matrix for the strands. Actually, the resinous, elastomeric or polymeric material is applied to the braid in liquid form to achieve a thorough penetration. It may also be applied to the strands prior to braiding, that is preimpregnated fibers may be used. Once the matrix forming material is in the braid, the material may be cured or polymerized at room temperature or by heating. The procedure is substantially the same as that used in forming the tube overwrap 12, and a suitable method is disclosed in U.S. Pat. No. 3,586,058.

The sealant overwrap 16 holds the sealant layer 14 in place about the inner overwrap 12, maintains the sealant layer 14 in a state of precompression, retains the sealant material at and around a puncture in the sealant layer 14, and protects the sealant layer 14 from external objects as well as from external fuel and oil contamination. Unlike the tube overwrap 12, the sealant overwrap 16 has a relatively low modulus of elasticity so that it elongates and moves out of the way of a penetrating projectile and thereafter returns or snaps back to its original position to again support and restrict any outward movement of the sealant material 14.

Should a projectile P penetrate the fluid line F and in so doing pass through the hollow interior thereof, two ruptures or holes 26 and 28 (FIG. 2) will occur within the wall of the fluid line F, one where the projectile enters and the other where the projectile exists. At the entry hole 26 the projectile P will slice through the sealant overwrap 16, the sealant 14, the tube overwrap 12, and the liner 18 of the tube 10 in that order. Since the sealant overwrap 16 possesses a low modulus of elasticity, it will stretch and then rebound to the extent that the hole therein is about the size of a pencil point in diameter. The sealant overwrap 16 will not assume a permanent inward deformation, or in other words, it will not petal inwardly at the entry hole 26. Hence, the sealant overwrap 16, while still confining the sealant 14 to prevent it from spreading outwardly, does not in any way prevent the sealant from closing upon itself to seal off the entry hole 26.

Two factors enable the sealant 14 to close upon itself at the entry hole 26 and seal off that hole. First, the sealant 14 is maintained in a state of precompression by sealant overwrap 16, so that it is pierced by the projectile it tends to expand and close the hole 26 through it. Secondly, fuel from the interior of the tube 10 will flow out of the entry hole 26 and contact the sealant 14 in the vicinity of the entry hole 26. The sealant 14 in turn will swell in the presence of the fuel so as to tightly close the entry hole 26. The tube overwrap 12 and the tube 10 are also sliced by the projectile P, but neither tends to petal inwardly.

At the exit hole 28 (FIGS. 2 & 3) the projectile will pass through the tube 10, the tube overwrap 12, the sealant 14 and the sealant overwrap 16 in that order. As the projectile P passes through the fluid and enters the wall of the tube 10, it creates a substantial force against the inside surface of the tube. This force is not only the result of the kinetic energy of the projectile, but also the hydraulic forces built up in the liquid as the projectile P passes through it. The latter is commonly referred to as the hydraulic ram effect. Were it not for the surrounding tube overwrap 12, the tube 10 would most likely undergo substantial deformation and tearing as a result of the projectile exiting therefrom. The tube overwrap 12, however, rigidifies the tube 10 and enables it to withstand the hydraulic ram effect and the force of the moving projectile P without undergoing significant deformation or substantial tearing. Inasmuch as the wall thickness of the tube 10 at the liner 18 is quite thin, there is little if any petalling at the exit hole. In particular, the metal of the tube tends to tear slightly at the exit hole, but any petalling which does occur as the projectile P passes through the liner portion 18 is immediately turned back inwardly by the surrounding tube overwrap 12, once the projectile has passed. In this connection, it should be noted that the liner portion 18 is so thin that the surrounding tube overwrap 12 possesses greater strength and tends to turn any outward deformation of the liner portion 18 inwardly. Since the tube overwrap 12 has a high modulus of elasticity, it tends to fracture as the projectile P passes through it, but does not deform permanently into the surrounding sealant 14. Thus, neither the tube 10 nor the tube overwrap 12 petal outwardly and hold the surrounding sealant 14 away from the exit hole 28, as is true of prior art fuel lines.

The sealant 14, due to its state of precompression, expands immediately after the passage of the projectile P through it to close the exit hole 28. Also, the fuel which contacts the sealant 14 at the exit hole 28 causes the sealant 14 to swell and thereby tightly close the exit hole 28. Since neither the liner portion 18 nor the tube overwrap 12 petal at the exit hole 28, only a thin layer of sealant 14 is necessary, and this reduces both the weight and bulk of the fuel line F. In other words, since none of the sealant is required to accommodate petalling as is true of conventional fuel lines, the sealant 14 need only be thick enough to close the exit hole, and such a thickness is quite small. For example, in a standard 3 inch ID fuel line the sealant is 0.35 inches thick and weights 1.35 lbs. per lineal foot of fuel line. In the fuel line F having a 3 inch ID, the sealant is 0.11 inches thick and weights 0.44 lbs. per lineal feet. The overall thickness, that is the OD of the standard fuel line, is 3.90 inches, whereas with the fuel line F it is 3.45 inches.

The projectile P merely fractures the sealant overwrap 16 upon passing through it, but the overwrap 16 remains intact surrounding the exit hole and continues to maintain the sealant 14 in place.

The two connecting portions 20 are of the same size and strength as the ends of standard fuel lines so that they can be coupled with standard fittings. Moreover, the diameter of the fuel line F is less than that of standard self-sealing lines so that the line F will fit wherever a conventional line is used. Hence, the fuel line F is completely interchangeable with conventional fuel lines and can be used as a replacement therefor. No bulkhead openings need be enlarged, nor need any bracketing be changed.

Since the fuel flowing within the fuel line F runs along the metal surfaces of the tube 10 any triboelectric charging which develops in the moving fuel is conducted away through the metal tube 10 to a suitable ground.

MODIFICATIONS

In lieu of the tube 10 having connecting portions 20 formed integral with its ends, a modified tube 30 (FIG. 5) having a liner portion 32 of constant wall thickness and separate end connectors or inserts 34 may be used. The wall thickness of the liner portion 32 is the same as that of the liner portion 18 of the tube 10. The inserts 34 fit into the ends of the liner portion 32 and are attached thereto by a suitable connecting procedure such as brazing or welding.

Still another modified tube 36 (FIG. 6) has a liner 38 and a connecting portion or insert 40 abutting the ends of the liner 38. The insert 40 has a stepped end portion 42, and this end portion 42 is embedded in the tube overwrap 12. The strands of the overwrap 12 are braided into multiple layers with some of the layers passing inside of the end portion 42 and others passing over the end portion 42. The end portion 42 has serrations 44 which embed in the resin matrix and secure the insert 40 firmly to the tube overwrap 12.

While the invention has been described in conjunction with fuel lines, the principles of it are applicable to other types of containers, for example, fuel tanks.

The invention also has utility in the field on conduits generally. In this connection, it should be noted ducting made entirely from impregnated braiding is difficult to couple. Metal ducting on the other hand is easily coupled, but it quite heavy. A duct composed of the tube 10 and the tube overwrap 12, but not the sealant 14 and sealant overwrap 16 overcomes the foregoing problems for it is both light in weight and easily coupled. Such ducting may be employed as a replacement for metal conduits used to transfer cryrogenic fluids because it is strong and easily coupled, and yet due to the thin wall thickness of the liner portion 18 conduits little heat back to the fluid resirvoir.

This invention is intended to cover all changes and modifications of the example of the invention herein chosen for purposes of the disclosure which do not constitute departures from the spirit and scope of the invention.

What is claimed is:

1. A self-sealing hollow body for holding a liquid even after the body is pierced by a projectile, said hollow body comprising: an impervious metal structure which is configured to form a cavity in which the liquid is contained, the metal structure including a liner portion having a wall thickness between approximately 0.002 inches and approximately 0.015 inches and a connecting portion having a greater wall thickness of at least about 0.028 inches, the liner portion occupying substantially greater area of the metal structure than the connecting portion so that the metal structure is for the most part constituted of the liner portion, the connecting portion being partially exposed beyond the liner portion and surrounding an opening leading into the cavity, the connecting portion being substantially stronger than the liner portion with its strength being sufficient to enable the hollow body to be coupled to some other device at the connecting portion; a rigidifying layer extending over and obscuring the entire liner portion of the metal structure and reinforcing the liner portion, the rigidifying layer further extending beyond the liner portion and over that part of the connecting portion which is contiguous to the liner portion, the rigidifying layer including strands of non-metallic material which encircle the liner portion and part of the connecting portion and which will remain substantially undistorted in the lateral direction after being pierced by a projectile, the strength of the rigidifying layer in comparison to the liner portion of the metal structure being such that the liner portion does not, after the passage of a projectile through the hollow body, project beyond the rigidifying layer at the exit hole left by the projectile and petalling of the metal liner portion does not occur at the exit hole; a sealant layer extended over the rigidifying layer and being capable of swelling when contacted by the liquid so as to close a hole imparted thereto by a projectile passing through the hollow body; and means extending over the sealant layer for maintaining the sealant in place.

2. The structure according to claim 1 wherein the rigidifying layer further includes a resin or polymetric matrix in which the nonmetallic strands are embedded.

3. The structure according to claim 2 wherein strands of the rigidifying layer are braided over the liner portion of the metal structure.

4. The structure according to claim 3 wherein the connecting portion is initially separate from the liner portion and is attached thereto.

5. The structure according to claim 4 wherein the connecting portion is attached to the rigidifying layer.

6. The structure according to claim 1 wherein the means for maintaining the sealant in place also maintains the sealant in a state of precompression.

7. The structure according to claim 1 wherein the liner portion is made of aluminum or aluminum alloy and has a wall thickness between 0.002 inches and 0.010 inches.

8. The structure according to claim 1 wherein the liner portion is made from titanium or an alloy of titanium and has a wall thickness between 0.002 inches and 0.010 inches.

9. The structure according to claim 1 wherein the liner portion is made from stainless steel and has a wall thickness between 0.002 inches and 0.010 inches.

10. The structure according to claim 1 wherein the metal structure is in the configuration of a tube with the connecting portion being at the end of the tube.

11. The structure according to claim 1 wherein the impervious metal structure is a tube with the connecting portion being at the end of the tube and being formed integral with and extended axially from the liner portion.

* * * * *